United States Patent [19]
Garvey, Jr. et al.

[11] Patent Number: 4,792,159
[45] Date of Patent: Dec. 20, 1988

[54] SNOW SKI TRANSPORTING DEVICE

[76] Inventors: Charles C. Garvey, Jr., 7336 Hurst St., New Orleans, La. 70118; Mitchel E. Winegeart, 4512 Hessmer Ave., Metairie, La. 70002

[21] Appl. No.: 52,708

[22] Filed: May 19, 1987

Related U.S. Application Data

[63] Continuation of Ser. No. 644,055 Aug. 23, 1984, Pat. No. 4,666,184.

[51] Int. Cl.$^4$ .............................................. A63C 10/02
[52] U.S. Cl. ................................ 280/814; 280/47.13 R
[58] Field of Search ......... 280/814, 47.13 R, 47.13 B, 280/63, 79.1 A; 190/18 A

[56] References Cited

U.S. PATENT DOCUMENTS

| | | | |
|---|---|---|---|
| 1,788,150 | 1/1931 | Curtin | 280/35 |
| 3,717,357 | 2/1973 | Schaefer | 280/47.13 R |
| 3,851,689 | 12/1974 | Kohls | 280/814 |
| 4,269,435 | 5/1981 | Farvenkyla | 280/814 |

FOREIGN PATENT DOCUMENTS

| | | | |
|---|---|---|---|
| 443498 | 4/1927 | Fed. Rep. of Germany | 280/814 |
| 2358171 | 2/1978 | France | 280/814 |
| 2471796 | 6/1981 | France | 280/814 |
| 451775 | 5/1968 | Switzerland | 280/814 |
| 581487 | 11/1976 | Switzerland | 280/814 |

Primary Examiner—John J. Love
Assistant Examiner—Richard Camby
Attorney, Agent, or Firm—Pravel, Gambrell, Hewitt, Kimball & Krieger

[57] ABSTRACT

This invention relates to a ski carrier that has a wheel removable mounted on each upper surface of the tail end of two skis. The wheels are on stub axles that are received on the upper surface of the ski and allow the skis to be transported when the bottom of the skis are adjacent each other. In one embodiment a strap extends between each of the two wheels.

10 Claims, 2 Drawing Sheets

SNOW SKI TRANSPORTING DEVICE

This is a continuation-in-part of application Ser. No. 644,055, filed Aug. 23, 1984, now U.S. Pat. No. 4,666,184.

BACKGROUND OF THE INVENTION

The present invention relates to snow ski carriers and more particularly to an improved snow ski carrier which attaches to and holds together one end portion of the skis with a collapsable wheeled assembly so that the skier can either pull or push the skis upon the wheeled assembly while transporting the skis yet disassemble the assembly, collapsing the wheel base so that the apparatus can be carried in his pocket while skiing.

Snow skiing is a popular and exhilirating winter sport. The sport has become increasingly popular, attracting larger and larger crowds. To accommodate a large number of skiers, hugh ski areas have been developed, each covering one or more mountain slopes. Ski lifts, gondolas and trams carry skiers from a "base area" to the mountain tops where they ski down the snow covered mountain slopes to the base area where they started. Large ski areas have multiple lifts and thus can accommodate thousands of skiers in a given day. The thousands of skiers require transportation to the ski area because of their usual remoteness from populated cities. Skiers travel to the ski slopes by automobile or by bus. Thus, most ski areas provide large parking lots at the base area.

Unfortunately, skiers must transport their equipment from the parking lot areas to the bottom of the ski lift. This distance is usually substantial, often as much as a quarter mile, half mile or more. The distance is usually an uphill walk because the base area can often be on the lower side of a mountain where grades are still substantial. The distance that a skier must travel is aggravated by other factors which create sources of fatigue for the skier.

Skiers must carry to the slopes a great deal of heavy and bulky equipment that is used in skiing. Firstly, skiers wear heavy clothing to protect them from the intense cold and wind they will face on the mountain top and slopes. Secondly, the skier wears heavy confining boots which support his or her feet and ankles during skiing. Walking in these heavy, confining ski boots is quite arduous. This is due in part to their weight and in part to the fact that they immobilize the skier's ankle joint. Thirdly, the skier must carry a pair of skis and poles which are relatively heavy. The skis are also awkward to carry since they are usually about as long as the skier is tall (or slightly longer). The skis typically must be held together as a unit in order to handle them with any ease at all. This is normally done by placing the corresponding bottom surfaces of the skis together and holding them in that position while the skis are supported on the skier's shoulder or under one arm. The skier can then use his or her other hand to carry ski poles, handbags, and other such paraphernalia which is a part of the sport.

Various ski carriers have been patented which attempt to solve the above problems and thus lessen the skier's burden. Several of these devices require the skier to support the full weight of the skies.

A typical example of such a carrier can be seen in U.S. Pat. No. 4,190,182 issued to D. Hickey, entitled "Ski Carrier."

Some patents have attempted to provide rolling ski carriers. Examples are U.S. Pat. No. 4,268,050 issued to R. Kennedy entitled "Ski Accessory Transportation and Storage System," and U.S. Pat. No. 3,504,921 issued to Osmond. The Kennedy and Osmond devices are large, bulky devices resembling golf carts having bulky, expansive frames designed to carry multiple pairs of skis. These devices suffer because of their large frames and resultant and weight. They present storage problems to the skier that has reached the ski lift but has left his car or bus behind in the base area parking lot as is usually the case. Another problem with the Kennedy and Osmond devices is that when the skis are lifted, the carrier doesn't easily go with the skis. Thus, carrying the skis up or down steps or into shops and restrooms is a problem with the the abovementioned carriers.

Another ski carrier attempting to provide rollers so that the skis can be rolled over bare surfaces is the Maller device shown in U.S. Pat. No. 4,131,289 entitled "Ski Equipment Carrier." This device uses a bag-like container which covers and contains the skis and poles. The bottom of the bag has a semi-oval base with small rollers. This device is too bulky to be carried in the skier's pockets after removal. Its geometry necessarily requires that the skis be plumbed almost vertically for the rollers to abut the ground for purposes of rolling, making it awkward for use by short people or children. Because of its complexity, installation and removal from the skis would be awkward and time-consuming.

Other patents, listed below, show various wheeled ski carriers:

| U.S. Patent Documents | | |
|---|---|---|
| U.S. Pat. No. | Title | Issue Date |
| 1,788,150 | Baggage Carrier | Jan. 6, 1931 |
| 3,717,357 | Adjustable Dolly Construction | Feb. 20, 1973 |
| 3,851,689 | Foldable Ski Cover | Dec. 3, 1974 |
| 4,269,435 | Fastening Means For Skis | May 26, 1981 |

| Foreign Patent Documents | | | |
|---|---|---|---|
| Document No. | Date | Country | Name |
| 2,358,171 | 2/1978 | France | Allaine |
| 2,471,796 | 6/1981 | France | Gainville |
| 581,487 | 11/1976 | Swiss | Imfeld |
| 451,775 | 5/1968 | Swiss | Becker-Elmer |
| 443,498 | 4/1927 | Germany | Oeschler |

These devices generally suffer because they do not collapse for easy carriage in a user's pocket, have bulky fixed wheel bases, and enlarged structural parts that would be heavy to carry, bulky to store and expensive to manufacture.

SUMMARY OF THE INVENTION

The present invention provides an improved, wheeled ski transport device having a pair of spaced apart wheels that are independently connectable to the skis so that the wheels define a spaced wheelbase when the skis are placed in a parallel relationship to each other. Each wheel is preferably removably attached to the skis so that the skis are generally in between the wheels when transporting. In the preferred embodiment the wheels have axles that interlock with receptacles or slots directly on the skis. An engaging strap can be used to hold the wheels in a fixed position on the skis.

In the preferred embodiment, each wheel carries an axle and each axle has an end portion that cooperates with a receptacle carried on the ski tail area or on a bracket affixed to the ski tail area. The first and second wheels are thus respectively connected to first and second axles so that the elastic strap secures the wheels in a position on either side of the aligned (bottom to bottom) skis and extending beyond the side edges of the skis so that when the skis are supported sideways and the bottoms defining a vertical plane, the wheels extend laterally of the paired skis defining a wheelbase with the skis therebetween.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF THE PREFERRED EMBODIMENT

Figure 1:
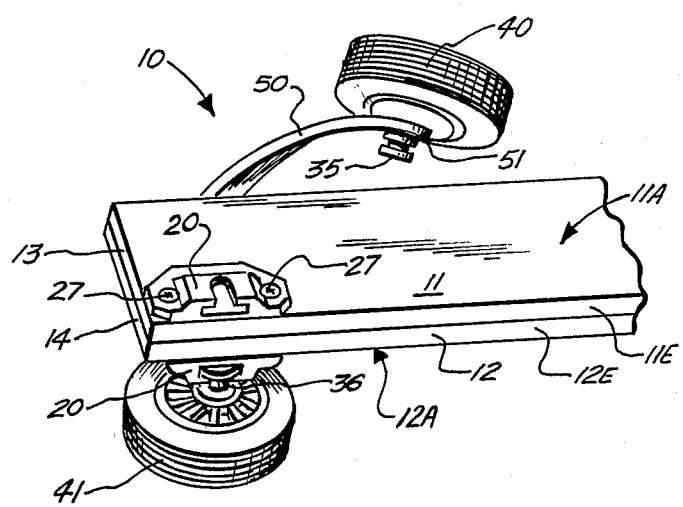
FIG. 1 is a partial, perspective view of the preferred embodiment of the apparatus of the present invention.

FIGS. 1-6 show the preferred embodiment of the apparatus of the present invention designated generally by the numeral 10. In FIG. 1, there can be seen a pair of snow skis 11, 12 which are held in a aligned position with the bottom surfaces of the skis 11, 12 abutting in a corresponding face-to-face relationship. The ski bottom surfaces are typically flat and unobstructed while the ski tops typically carry bindings (not shown). Ski 11 provides a tail end portion 13 while ski 12 provides a tail end portion 14. In FIG. 1, each ski provides an edge 11E, 12E on each side of the ski. The preferred embodiment of the present invention includes a receptacle body 20 of preferably molded plastic construction using, for example, plastic injection. Receptacle body 20 can also be machined from metal such as stainless steel, for example. A pair of receptacle bodies 20 attaches respectively to the upper surfaces 11A, 12A of the skis 11, 12.

Figure 3:
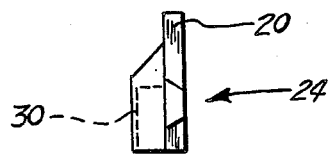
FIG. 3 is a side view of the receptacle portion of the preferred embodiment of the apparatus of the present invention.
Figure 4:
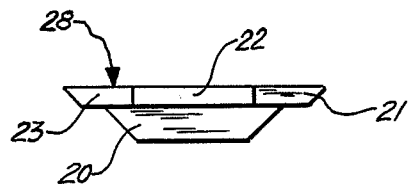
FIG. 4 is a top view of the receptacle portion of the preferred embodiment of the apparatus of the present invention.
Figure 5:
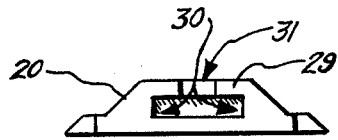
FIG. 5 is a bottom view of the receptacle portion of the preferred embodiment of the present invention.

Each receptacle body 20 includes a peripheral flanged area that includes, for example, three flanges 21, 22, 23 which are each provided with an opening 24, 25, 26 respectively. Openings 24-26 would be countersunk openings such as, for example, as shown in FIG. 3 and accommodate fasteners such as countersunk type screws, for example, designated by the numeral 27 in FIG. 1. Screws 27 can be used to attach each receptacle body 20 to its respective ski 11, 12 in similar fashion to the manner in which ski bindings are attached to skis using threaded fasteners such as screws.

The rear surface 28 of body 20 is substantially flat and provides a surface which abuts the upper surface 11A, 12A of each ski 11, 12. In FIG. 1, it should be thus understood that the skis 11, 12 as shown are in a positioned assembled together with the ski bottoms abutting. This is a common position for skis during transportation wherein the bottoms are affixed together so that the ski bindings and the ski tops are exposed.

Figure 2:
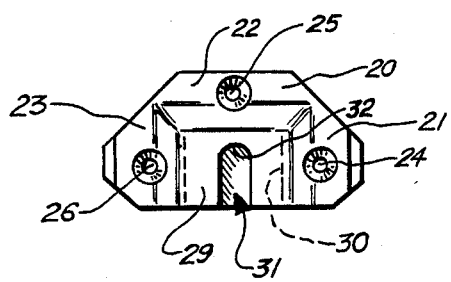
FIG. 2 is a side view of the receptacle portion of the preferred embodiment of the apparatus of the present invention.

In FIGS. 2-5, the receptacle body 20 includes an inner, enlarged slot 30 communicating with a smaller slot 31. The smaller slot 31 is open in a downwardly direction as shown in FIG. 2 and terminates at end portion 32 of slot 31. In FIGS. 2-3, the enlarged rectangular slot 30 is shown in phantom lines.

Figure 6:
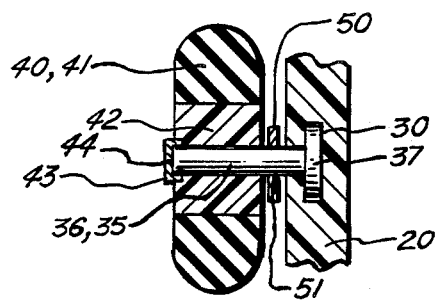
FIG. 6 is a fragmentary view illustrating an engagement of the axle and receptacle portions of the preferred embodiment of the apparatus of the present invention.

A pair of wheels 40, 41 is rotatably mounted upon its respective or stub axle 35, 36 which includes a flanged end portion 37 as best shown in FIG. 6. The axles 35, 36 rotatably support wheels 40, 41 which can be, for example, of a rubber construction having a central hub 42. A hub cap 43 such as, for example, a simple retainer ring that engages an annular slot at the outermost end portion 44 of the axles 35, 36 could be used to secure wheels 40, 41 upon axles 35, 36. An elongated rubber strap 50 would be used to hold each axle and more particularly the flanged 37 portions thereof in the slot 30 as best shown in FIG. 6. The slot 31 would provide a means for entry of the axle 35, 36 into the slot when the flanged portion 37 of each axle 35, 36 engages the slot 30 as best seen in FIG. 6. The strap 50 would preferably have openings at its end portions 50, 51 receptive of axles 35, 36.

Figure 7:
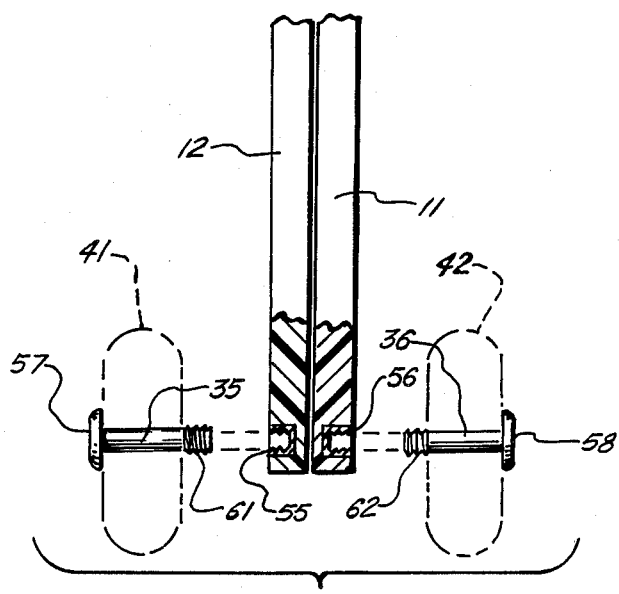
FIG. 7 is a fragmentary top view of the alternate embodiment of the apparatus of the present invention.
Figure 8:
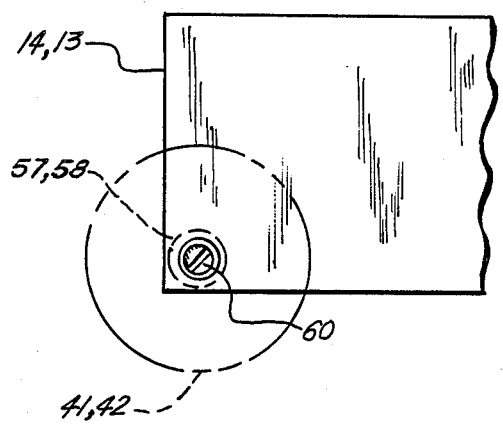
FIG. 8 is a side view of an alternate embodiment of the apparatus of the present invention.

In the alternate embodiment of FIGS. 7-8, the axles 35, 36 have threaded end portions that engage correspondingly threaded receptacle sockets 55, 56. Each axle 35, 36 can have a flanged outer end hub 57, 58 which preferably carries a transverse slot 60 that is receptive of a screwdriver. Alternately, hubs 57, 58 could carry a thumb screw type end. The threaded end portions 61, 62 of axles 35, 36 can be oppositely threaded in a direction which tightens the axles into the sockets when the skis are transported with both wheels turning in the same direction.

Because many varying and different embodiments may be made within the scope of the inventive concept herein taught, and because many modifications may be made in the embodiment of the law, it is to be understood that the details herein are to be interpreted as illustrative and not in a limiting sense.

What is claimed as invention is:

1. A snow ski carrier for transporting a pair of skis having front and tail end portions, and an upper surface comprising:
   a. a pair of wheel attachment receptacle means, each carried respectively and independently by each ski at the tail end portion and on said upper surface of each said ski;
   b. a pair of wheel means for providing a rolling surface that can engage the ground near the wheel attachment receptacle means when the front end portion of the skis are used by a skier during transportation of the skis;
   c. disconnectable holding means for maintaining the wheel means in an engaged position with the receptacle means during transporting of the skis; and
   d. the wheel attachment receptacle means being carried respectively by each separate ski when the user is skiing and the wheels are removed.

2. The apparatus of claim 1, wherein the holding means includes an axle for rotatably holding each wheel, and means carried by the end of each axle respectively for engaging the receptacle means.

3. A snow ski carrier for transporting a pair of skis having front and tail end portions, comprising:
   a. a pair of wheel attachment receptacle means, each carried respectively and independently by each ski at the tail end portion of each ski;
   b. a pair of wheel means for providing a rolling surface that can engage the ground near the wheel attachment receptacle means when the front end portion of the skis are used by a skier during transportation of the skis;
   c. disconnectable holding means for maintaining the wheel means in an engaged position with the receptacle means during transporting of the skis; and
   d. the wheel attachment receptacle means being carried respectively by each separate ski when the user is skiing and the wheels are removed, wherein the holding means comprises in part a strap that extends between the wheel means.

4. The apparatus of claim 3, wherein the strap is rubber.

5. The apparatus of claim 1, wherein the receptacle means includes a recess carried by each ski.

6. A snow ski carrier for transporting a pair of skis having front and tail end portions, comprising:
   a. a pair of wheel attachment receptacle means, each carried respectively and independently by each ski at the tail end portion of each ski;
   b. a pair of wheel means for providing a rolling surface that can engage the ground near the wheel attachment receptacle means when the front end portion of the skis are used by a skier during transportation of the skis;
   c. disconnectable holding means for maintaining the wheel means is an engaged position with the receptacle means during transporting of the skis; and
   d. the wheel attachment receptacle means being carried respectively by each separate ski when the user is skiing and the wheels are removed,
   wherein the holding means includes an axle for rotatably holding each wheel, and means carried by the end of each axle respectively for engaging the receptacle means, and
   wherein the receptacle means includes a slot and each axle has a flanged end portion that can engage the slot.

7. The apparatus of claim 1, wherein the receptacle means includes a pair of threaded sockets carried respectively by the tail end portions of the skis, and the holding means includes a pair of axles, each having threaded end portions that can threadably connect the axles respectively with the pair of threaded sockets.

8. The apparatus of claim 7, wherein each socket and each axle are threaded in directions which can tighten the axles into the sockets when the skis are transported with both wheels rolling.

9. A snow ski carrier for transporting a pair of skis having front and tail end portions, comprising:
   a. a pair of wheel attachment receptacle means, each carried respectively and independently by each ski at an end portion of each ski;
   b. a pair of wheel means for providing a rolling surface that can engage the ground near the wheel attachment receptacle means when the opposite end portion of the skis are used by a skier during transportation of the skis;
   c. disconnectable holding means for maintaining the wheel means in an engaged position with the receptacle means and for connecting the two wheel means during transporting of the skis; and
   d. the wheel attachment receptacle means being carried respectively by each separate ski when the user is skiing and the wheels are removed,
   wherein the holding means comprises two separate stub axle means, each said stub axle means being connected to a single wheel means.

10. The apparatus of claim 9, wherein each wheel means is independent of the other wheel means.

* * * * *